US009381837B2

(12) United States Patent
Tone et al.

(10) Patent No.: US 9,381,837 B2
(45) Date of Patent: Jul. 5, 2016

(54) SEAT APPARATUS FOR VEHICLE

(71) Applicant: AISIN SEIKI KABUSHIKI KAISHA, Kariya-shi (JP)

(72) Inventors: Daisuke Tone, Kariya (JP); Masahiro Takezaki, Kariya (JP); Kazuya Iwasa, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/613,813

(22) Filed: Feb. 4, 2015

(65) Prior Publication Data

US 2015/0217662 A1    Aug. 6, 2015

(30) Foreign Application Priority Data

Feb. 6, 2014   (JP) ................. 2014-021400

(51) Int. Cl.
*B60N 2/30* (2006.01)
*B60N 2/36* (2006.01)
*B60N 2/02* (2006.01)
(Continued)

(52) U.S. Cl.
CPC ............ *B60N 2/3075* (2013.01); *B60N 2/0228* (2013.01); *B60N 2/206* (2013.01); *B60N 2/309* (2013.01); *B60N 2/3011* (2013.01);
(Continued)

(58) Field of Classification Search
CPC .... B60N 2/3065; B60N 2/309; B60N 2/3013; B60N 2/3011; B60N 2/0232; B60N 2/3093; B60N 2/366; B60N 2002/363; B60N 2/22; B60N 2/4858; B60N 2002/445; B60N 2205/20; B60N 2/0228; B60N 2/20

USPC ............ 297/378.12, 337, 340, 15, 313, 341, 297/331, 336
See application file for complete search history.

(56) References Cited

U.S. PATENT DOCUMENTS 2,668,076 A * 2/1954 Troche ............... E05C 1/145
292/336.3
4,881,767 A * 11/1989 Kondo ............... B60N 2/366
292/224

(Continued)

FOREIGN PATENT DOCUMENTS

EP    1 493 611 A1    1/2005
JP    2007 186105    7/2007

(Continued)

OTHER PUBLICATIONS

Extended European Search Report issued Jul. 29, 2015 in Patent Application No. 15154136.4.

*Primary Examiner* — Glenn Dayoan
*Assistant Examiner* — Sunsurraye Westbrook
(74) *Attorney, Agent, or Firm* — Oblon, McClelland, Maier & Neustadt, L.L.P.

(57) ABSTRACT

A seat apparatus for a vehicle includes: an unlocking lever that is operated so as to unfix a seat from a vehicle floor; and a control switch that is operated in order for the seat to switch between a deployed state in which the seat is supported on the vehicle floor and a folded state in which the seat is retracted in a concave retraction portion of the vehicle floor, when a support member of the seat is driven via the driving of an actuator, wherein the unlocking lever is provided in a back surface of a seatback which is disposed at an opening end of the concave retraction portion when the seatback is folded forward and the seat is retracted, and the control switch is provided integrally with the unlocking lever.

9 Claims, 10 Drawing Sheets

(51) Int. Cl.
  *B60N 2/20* (2006.01)
  *B60N 2/44* (2006.01)
(52) U.S. Cl.
  CPC ............ *B60N2/3054* (2013.01); *B60N 2/3065* (2013.01); *B60N 2/36* (2013.01); *B60N 2002/445* (2013.01)

(56) References Cited

U.S. PATENT DOCUMENTS

| | | | | |
|---|---|---|---|---|
| 6,106,066 | A * | 8/2000 | Moffa | B60N 2/3011 297/326 |
| 7,635,166 | B2 * | 12/2009 | Ishikawa | B60N 2/366 297/378.13 |
| 2007/0046088 | A1 | 3/2007 | Satta et al. | |
| 2008/0093875 | A1 | 4/2008 | Hatta et al. | |
| 2010/0032976 | A1 * | 2/2010 | Yamashita | B60N 2/0155 296/24.3 |
| 2011/0043020 | A1 * | 2/2011 | Nakane | B60N 2/3013 297/354.1 |
| 2011/0080027 | A1 | 4/2011 | Nakao et al. | |
| 2011/0260518 | A1 * | 10/2011 | Scheurer, II | B60N 2/3013 297/378.12 |
| 2012/0139312 | A1 * | 6/2012 | Kato | B60N 2/01583 297/330 |

FOREIGN PATENT DOCUMENTS

| | | |
|---|---|---|
| JP | 4602874 | 12/2010 |
| JP | 5038485 | 10/2012 |

* cited by examiner

DEPLOYED STATE

FOLDED STATE

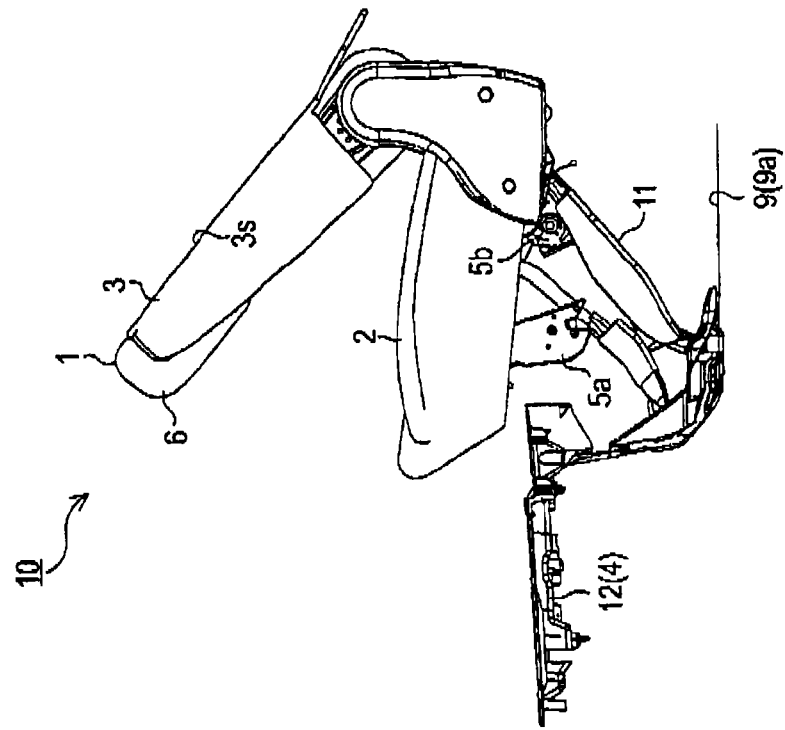
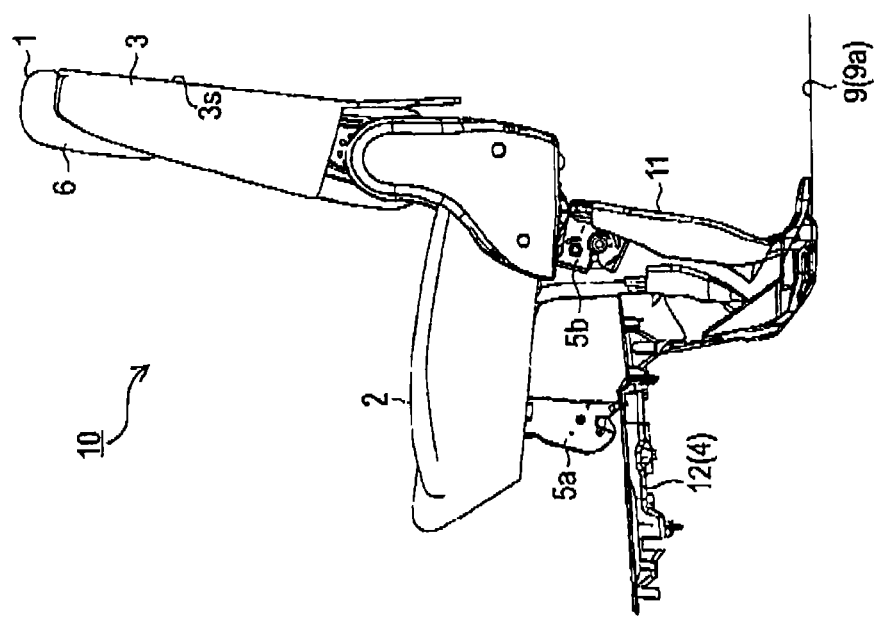

FOLDED STATE

FOLDING OPERATION

DEPLOYING OPERATION

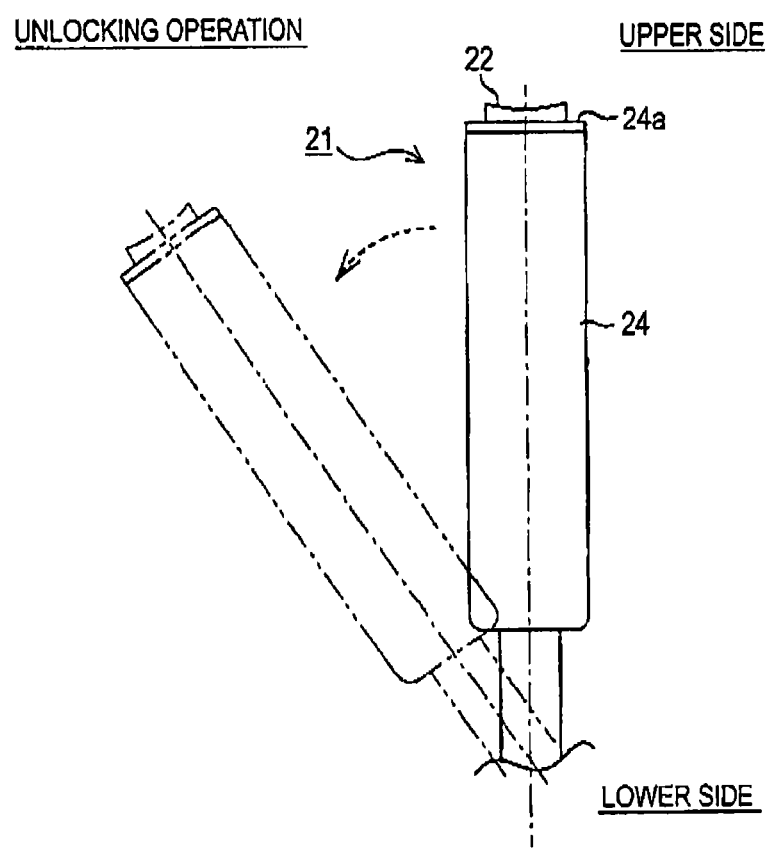

BEFORE UNLOCKING OPERATION

AFTER UNLOCKING OPERATION

SEAT APPARATUS FOR VEHICLE

CROSS REFERENCE TO RELATED APPLICATIONS

This application is based on and claims priority under 35 U.S.C. §119 to Japanese Patent Application 2014-021400, filed on Feb. 6, 2014, the entire contents of which are incorporated herein by reference.

TECHNICAL FIELD

This disclosure relates to a seat apparatus for a vehicle.

BACKGROUND DISCUSSION

In the related art, there is a seat apparatus that can retract a seat in a concave retraction portion in a vehicle floor in a state where the seat is folded. For example, a seat apparatus disclosed in JP 2007-186105A (Reference 1) has an operation member for retracting a seat and an operation member for folding a seatback forward in a back surface of the seatback. A user can manually deploy the seat on a vehicle floor, and fold the seat in the concave retraction portion by unfixing the seat from the vehicle floor, and releasing restriction of the tilting of the seatback via the operation of both of the operation members.

For example, a seat apparatus disclosed in Japanese Patent No. 4602874 (Reference 2) includes a seatback motor for tilting a seatback; a lock release motor for unfixing a seat from the vehicle floor; and a seat cushion motor for driving a seat (seat cushion) support member. It is possible to switch the seat between a deployed state in which the seat is supported on the vehicle floor, and a folded state in which the seat is retracted in the concave retraction portion using a drive force of each of the motors.

A large amount of force is required for deploying and folding the seat, and in contrast, it is possible to unfix (unlock) the seat from the vehicle floor with a relatively small amount of force. For this reason, it is considered that the size of the apparatus is reduced by implementing a manual release of the locking. However, in the related art, a control switch of an actuator is provided on a vehicle body in many cases. For this reason, there is a problem in that when a manual release of the locking is simply implemented, user-friendliness deteriorates.

That is, when the simplification of a configuration is taken into consideration, an unlocking lever of a locking device is preferably provided on the seat which is a moving body. Accordingly, in a case where the control switch of the actuator and the unlocking lever of the locking device are disposed separately from each other, there is a problem in that it may be difficult for a user to verify an unlocked state when a deployment operation and a folding operation start by the driving of the motor. Therefore, there is room for improvement in this regard.

SUMMARY

Thus, a need exists for a retractable seat apparatus for a vehicle which is not suspectable to the drawback mentioned above.

It is preferable that a seat apparatus for a vehicle according to an aspect of this disclosure includes: an unlocking lever that is operated so as to unfix a seat from a vehicle floor; and a control switch that is operated in order for the seat to switch between a deployed state in which the seat is supported on the vehicle floor and a folded state in which the seat is retracted in a concave retraction portion of the vehicle floor, when a support member of the seat is driven via the driving of an actuator, in which the unlocking lever is preferably provided in a back surface of a seatback which is disposed at an opening end of the concave retraction portion when the seatback is folded forward and the seat is retracted and the control switch is provided integrally with the unlocking lever.

BRIEF DESCRIPTION OF THE DRAWINGS

The foregoing and additional features and characteristics of this disclosure will become more apparent from the following detailed description considered with the reference to the accompanying drawings, wherein:

FIGS. 3A and 3B are views illustrating a transition of the state of the seat apparatus;

FIG. 7 is a side view of the unlocking lever;

DETAILED DESCRIPTION

Hereinafter, an embodiment of a seat apparatus for a vehicle will be described with reference to the accompanying drawings.

Figure 1:
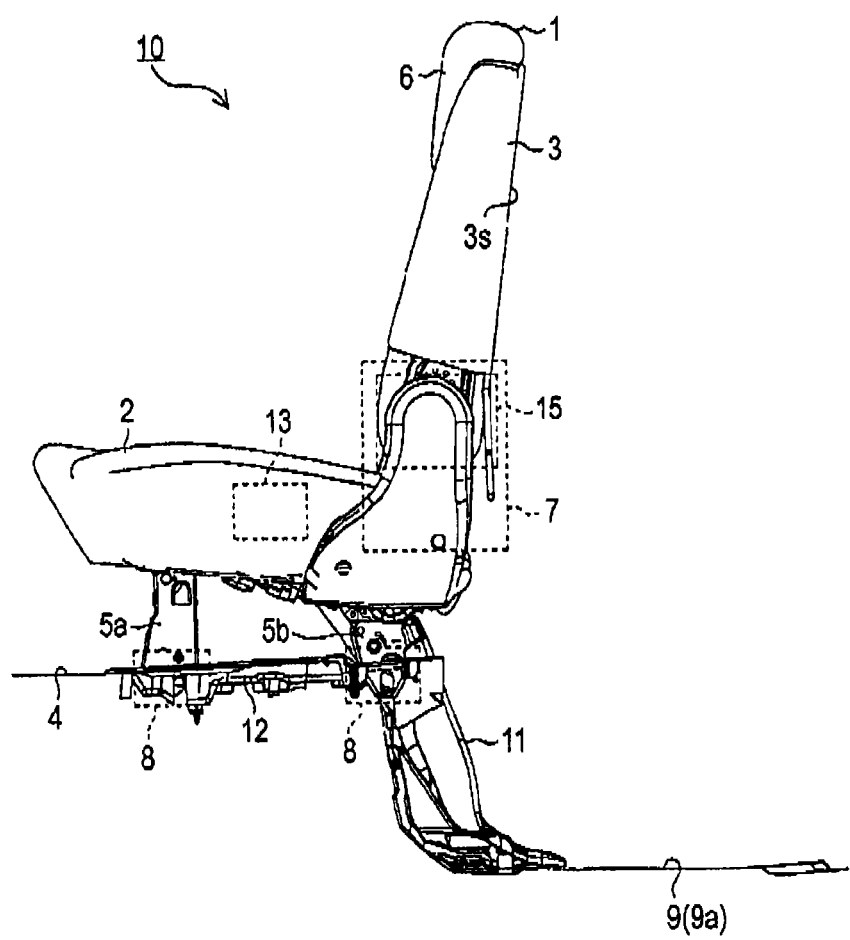
FIG. 1 is a side view of a seat apparatus (in a deployed state)
Figure 2:
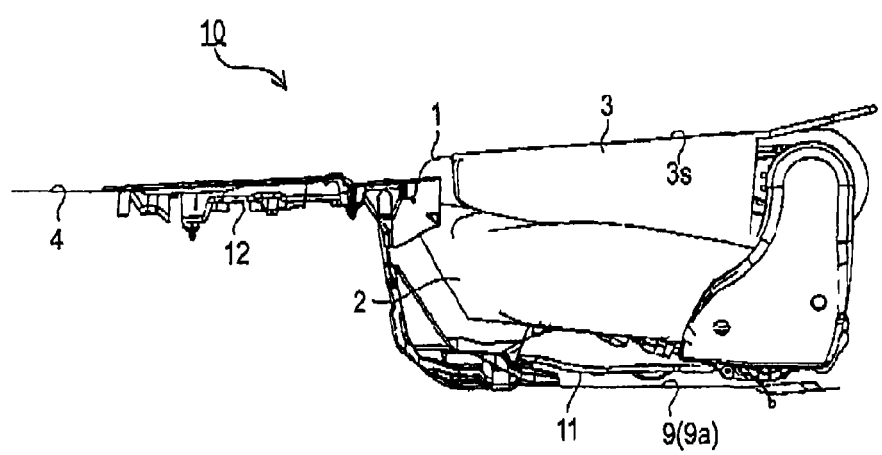
FIG. 2 is a side view of the seat apparatus (in a folded state)

As illustrated in FIGS. 1 and 2, a seat for a vehicle 1 includes a seat cushion 2, and a seatback 3 that is provided in a rear end portion of the seat cushion 2. In the embodiment, seat legs 5a and 5b are provided below the seat cushion 2, and support the seat cushion 2 above a vehicle floor 4. A head rest 8 is provided in an upper end portion of the seatback 3. A reclining device 7 is provided between the seat cushion 2 and the seatback 3, and can adjust the tilt angle of the seatback 3 with respect to the seat cushion 2 using a motor (not illustrated) as a drive source.

In the embodiment, the seat 1 is provided with a locking device 8 that can fix and unfix the seat 1 from the vehicle floor 4. Specifically, the locking device 8 has a well-known configuration including a latch mechanism (not illustrated) that engages and disengages with respect to a striker (not illustrated), and is provided in a lower end portion of each of the seat legs 5a and 5b. In the embodiment, a seat apparatus 10 is formed, which can retract the seat 1 in a concave retraction portion 9 of the vehicle floor 4 in a state where the seat 1 is folded, based on the function of the locking device 8.

Specifically, in the embodiment, the seat apparatus 10 includes a turning link 11 that is turnably connected to each of a bottom portion 9a of the concave retraction portion 9 and the seat cushion 2. In a vehicle of the embodiment, the concave retraction portion 9 is formed on a rear side (on the right side in FIGS. 1 and 2) of a seat deployment portion 12 that is set in the vehicle floor 4. An end of the turning link 11 is connected to a rear end of the seat cushion 2, and the other end of the turning link 11 is connected to the bottom portion 9a of the concave retraction portion 9, specifically, a front end portion of the bottom portion 9a.

In the embodiment, an actuator 13 is provided inside the seat cushion 2, and drives the turning link 11 using a motor (not illustrated) as a drive source. A forward folding mechanism 15 is provided in the reclining device 7 that is provided between the seat cushion 2 and the seatback 3 as described above, and the forward folding mechanism 15 can release restriction of the tilting of the seatback 3, and fold the seatback 3 forward.

That is, in the configuration of the seat apparatus 10 of the embodiment, as illustrated in FIGS. 1 to 3B, when the turning link 11 turns by virtue of a drive force of the actuator 13, the seat cushion 2 supported by the turning link 11 moves between the seat deployment portion 12 and the concave retraction portion 9. In the embodiment, the forward folding mechanism 15 is connected to the turning link 11 via a wire cable (not illustrated). Accordingly, the forward folding mechanism 15 is configured in such a manner as to release the restriction of the tilting of the seatback 3 during a folding operation in which the seat 1 is retracted in the concave retraction portion 9.

In the embodiment, when the seat cushion 2 moves into the concave retraction portion 9, the respective base ends of the seat legs 5a and 5b turn, and the seat legs 5a and 5b are folded inside the seat cushion 2. The seatback 3 is manually folded forward and pulled upright. In the embodiment, as illustrated in FIG. 2, the seatback 3 is disposed at an opening end of the concave retraction portion 9 when being folded forward and being folded on the seat cushion 2.

Figure 4:
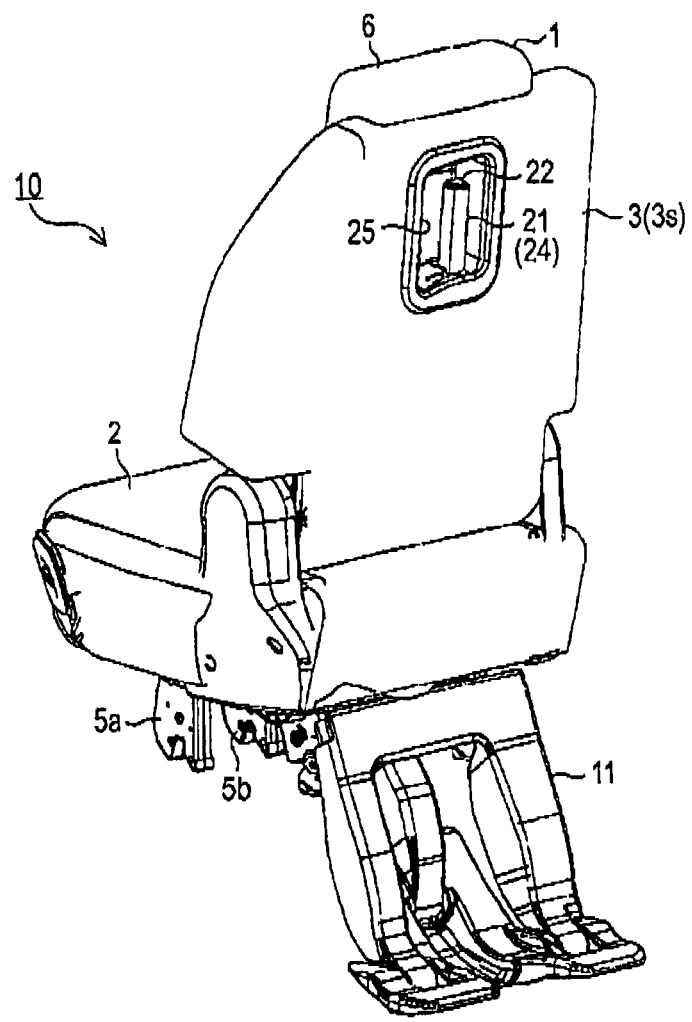
FIG. 4 is a perspective view of the seat apparatus (in a deployed state)
Figure 5:
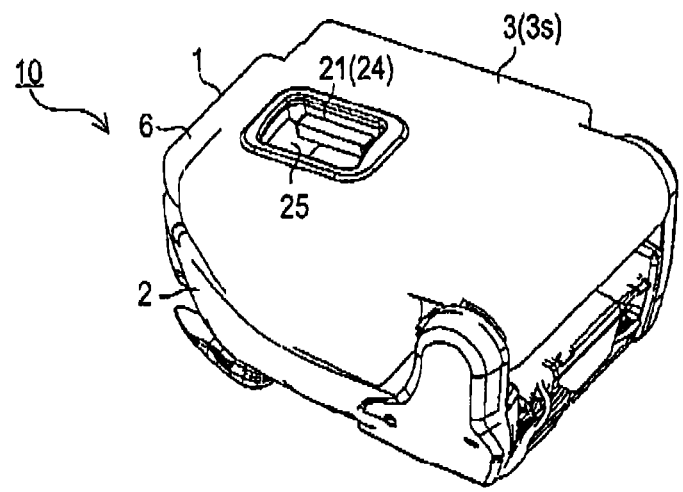
FIG. 5 is a perspective view of the seat apparatus (in a folded state)

In the embodiment, as illustrated in FIGS. 4 and 5, the seat apparatus 10 includes an unlocking lever 21 that is operated so as to unfix the seat 1 fixed by the locking device 8, and a control switch 22 of the actuator 13, which is operated in order for the seat 1 to switch between the deployed state in which the seat 1 is supported on the vehicle floor 4 and the folded state in which the seat 1 is retracted in the concave retraction portion 9. In the embodiment, the unlocking lever 21 is provided on a back surface 3s of the seatback 3. The control switch 22 is provided integrally with the unlocking lever 21.

Figure 6A:
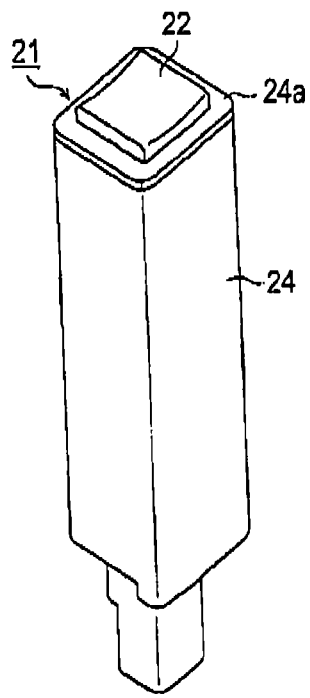
FIG. 6A is a perspective view of an unlocking lever, and FIGS. 6B and BC are plan views of the unlocking lever.

Specifically, in the embodiment, as illustrated in FIG. 6A, the unlocking lever 21 has a substantially quadrangular bar (shaft)-shaped appearance. The unlocking lever 21 has a grip portion 24 at an end thereof, which a user grips so as to operate the unlocking lever 21. The control switch 22 is provided on an end surface 24a of the grip portion 24.

As illustrated in FIGS. 4 and 5, a concave accommodation portion 25 for accommodating the unlocking lever 21 is formed on an inner side of the back surface 3s of the seatback 3. In the embodiment, the concave accommodation portion 25 is formed at a position higher than a vertical middle position on the back surface 3s of the seatback 3. In the embodiment, the unlocking lever 21 is disposed inside the concave accommodation portion 25 in a state where the grip portion 24 extends vertically along the back surface 3s of the seatback 3. In addition, a base end portion of the unlocking lever 21 passes through a lower side wall of the concave accommodation portion 25, and is connected to the locking device 8 via a wire cable (not illustrated) built into the seat 1. In the seat apparatus 10 of the embodiment, an unlocking operation of the unlocking lever 21 is transmitted to the locking device 8 via this wire cable.

Specifically, in the embodiment, as illustrated in FIG. 7, a turning operation (in a counter-clockwise direction in FIG. 7) of the unlocking lever 21 is performed in such a manner that the grip portion 24 disposed inside the concave accommodation portion 25 is fitted along the back surface 3s of the seatback 3. Accordingly, the wire cable connected to the base end portion of the unlocking lever 21 is pulled, and thereby the locking device 8 is unlocked. That is, the seat 1 is unfixed from the vehicle floor 4.

Figure 6B:
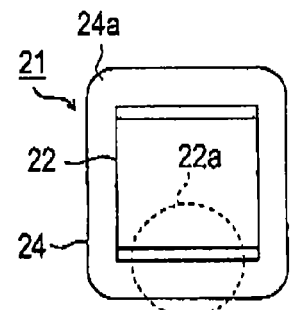
Figure 6C:
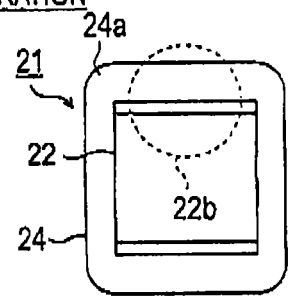

In the embodiment, as illustrated in FIGS. 6B and 6C, the control switch 22 is a push switch which has two independent operation portions 22a and 22b in end portions that are respectively positioned on a front side and a rear side (a lower end portion and an upper end portion respectively illustrated in FIGS. 6B and 6C), when a user faces the back surface 3s of the seatback 3 in which the unlocking lever 21 is provided.

Specifically, in the embodiment, as illustrated in FIG. 6B, when a user presses the first operation portion 22a that is positioned on the front side (the lower side in FIG. 6B) when facing the back surface 3s of the seatback 3, the control switch 22 outputs a control signal to the actuator 13, the control signal being indicative of driving the turning link 11 and folding the seat 1. As illustrated in FIG. 6C, when a user presses the second operation portion 22b that is positioned on the rear side (the upper side in FIG. 6C) when facing the back surface 3s of the seatback 3, the control switch 22 outputs a control signal to the actuator 13, the control signal being indicative of deploying the seat 1. In addition, in the embodiment, the control switch 22 is a momentary switch that continuously outputs (is turned ON) the related control signal only during the continued pressing operation. In the embodiment, the seat apparatus 10 controls the actuator 13 based on the operation of the control switch 22.

Figure 8:
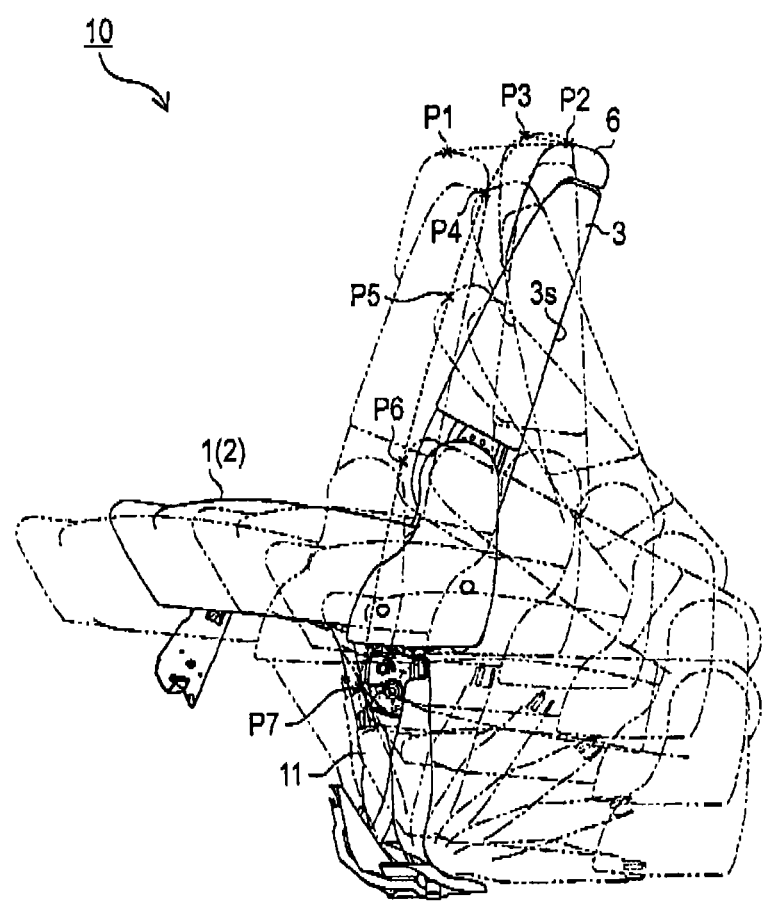
FIG. 8 is a view illustrating a locus of a seat during a folding operation.

More specifically, in the configuration of the seat apparatus 10 of the embodiment, as illustrated in FIG. 8, due to the turning of the turning link 11, the seat 1 (the seat cushion 2) supported by the turning link 11 is folded (and is deployed) while making an arc-shaped locus. In the configuration of the forward folding mechanism 15 of the embodiment, while a folding operation is performed, a wire cable (not illustrated) is pulled, which is interposed between the forward folding mechanism 15 and the turning link 11, and thereby the restriction of the tilting of the seatback 3 is released at an apex position (a movement position illustrated by the solid line in FIG. 8) of the locus of the seat.

Subsequently, an operation of the seat apparatus 10 with this configuration will be described.

When the deployed seat 1 (refer to FIG. 1) supported on the vehicle floor 4 is retracted in the concave retraction portion 9 while being folded (refer to FIG. 2), first, a user turns the unlocking lever 21 that is provided in the back surface 3s of the seatback 3 (refer to FIG. 7). The user turns the unlocking lever 21 while gripping the grip portion 24. Accordingly, in the embodiment, the locking device 8 at each of the seat legs 5a and 5b is unlocked, and thereby the seat 1 is unfixed from the vehicle floor 4.

After the unlocking operation is performed, the user presses the control switch 22 on the end surface 24a of the grip portion 24, and thereby the turning link (a support member) 11 turns by virtue of a drive force of the actuator 13, and the seat cushion 2 supported by the turning link 11 moves from the seat deployment portion 12 to the concave retraction portion 9. Specifically, the first operation portion 22a is pressed (refer to FIG. 6B). In the seat apparatus 10 of the embodiment, when the first operation portion 22a of the control switch 22 is continuously pressed, the seat cushion 2 supported by the turning link 11 is retracted in the concave retraction portion 9.

In the embodiment, since the turning link 11 and the forward folding mechanism 15 are interconnected with each other, the restriction of the tilting of the seatback 3 is released while the seat cushion 2 is on the way to the concave retraction portion 9. Accordingly, it is possible to manually fold the seatback 3 forward.

Here, as illustrated in FIG. 8, when the seatback 3 is folded forward, an upper end of the seatback 3 moves forward. In FIG. 8, each of points P1 to P7 indicate the position of the upper end of the seatback 3 (the head rest 6) when the seat 1 is folded (and is deployed).

In the seat apparatus 10 of the embodiment, this paint is taken into consideration, the forward folding mechanism 15 releases the restriction of the tilting of the seatback 3 at the apex position of the locus of the seat, That is, the seat cushion 2 supported by the turning link 11 is accommodated in the concave retraction portion 9 while moving rearward. Accordingly, after the seatback 3 passes the apex position of the locus of the seat, the seatback 3 is folded forward in a movement region in which the seat cushion 2 supported by the turning link 11 is considerably displaced rearward, and thereby a rearward displacement of the unlocking lever 21 associated with the rearward movement of the seat cushion 2 can be cancelled out by a forward displacement of the seatback 3 associated with the forward folding operation. Accordingly, in the embodiment, it is possible to prevent a change in the position of the unlocking lever 21 in a longitudinal direction of the vehicle.

In the embodiment, the forward folding mechanism 15 is configured in such a manner as to assist in folding the seatback 3 forward by biasing the seatback 3 forward using a spring member (not illustrated). The seatback 3 is folded on the seat cushion 2 via the forward folding operation, and is disposed at the opening end of the concave retraction portion 9. Accordingly, in the seat apparatus 10 of the embodiment, the seat 1 is retracted in the concave retraction portion 9 while the unlocking lever 21 faces the interior of the vehicle, the unlocking lever 21 being provided in the back surface 3s of the seatback 3.

In contrast, a user presses the second operation portion 22b of the control switch 22 provided in the unlocking lever 21, when deploying the seat 1 on the vehicle floor 4, the seat 1 being retracted in the concave retraction portion 9 while being in a folded state (refer to FIG. 6C). Accordingly, the turning link 11 turns by virtue of a drive force of the actuator 13 (in a counter-clockwise direction in FIGS. 1 to 3B), and thereby the seat cushion 2 supported by the turning link 11 moves from the concave retraction portion 9 to the seat deployment portion 12.

At this time, the seatback 3 is manually pulled upright, and the tilting of the seatback 3 is limited at a stage in which the seatback 3 is pulled upright to a predetermined position. The second operation portion 22b of the control switch 22 is continuously pressed, and the seat cushion 2 supported by the turning link 11 moves to the seat deployment portion 12. Accordingly, in the configuration of the seat apparatus 10 of the embodiment, the locking device 8 at each of the seat legs 5a and 5b is locked, and the seat 1 is fixed to the vehicle floor 4. As a result, the seat 1 is deployed so that an occupant can sit on the seat 1.

According to the embodiment, it is possible to obtain the following effects.

(1) The seat apparatus 10 includes the unlocking lever 21 that is operated so as to unfix the seat 1 from the vehicle floor 4. The seat apparatus 10 includes the control switch 22 that is operated in order for the seat 1 (the seat 1 being supported by the turning link 11) to switch between the deployed state in which the seat 1 is supported on the vehicle floor 4 and the folded state in which the seat 1 is retracted in the concave retraction portion 9, via the turning of the turning link 11 using a drive force of the actuator 13. The unlocking lever 21 is provided in the back surface 3s of the seatback 3 which is disposed at the opening end of the concave retraction portion 9 when the seatback 3 is folded forward and the seat 1 is retracted. The control switch 22 is provided integrally with the unlocking lever 21.

After an unlocking operation is performed, when a user takes their hands off the unlocking lever 21, the locking device 8 may be locked (be brought into a teeth engagement state) again due to the weight of the seat 1 or the like. However, in this configuration, it is possible to operate the control switch 22 in a state where the unlocking lever 21 is unlocked. As a result, it is possible to more reliably start the driving of the seat via the actuator 13 in a state where the seat 1 is unfixed from the vehicle floor 4. Accordingly, it is possible to prevent a retry operation originating from the teeth engagement of the locking device 8, and it is possible to realize good user-friendliness.

(2) The control switch 22 is a momentary switch that is continuously turned ON only while the control switch 22 is continuously operated.

In this configuration, when the operation of the control switch 22 is stopped, the actuator 13 stops quickly. Accordingly, it is possible to prevent an occurrence of pinching of the seat associated with the deployment operation and the folding operation of the seat. Since the control switch 22 is provided integrally with the unlocking lever 21, it is possible to operate the control switch 22 continuously from the unlocking operation without a pause. Accordingly, it is possible to smoothly complete the switching of the seat 1 between a deployed state and a folded state.

(3) The unlocking lever 21 is provided with the grip portion 24 that a user grips so as to operate the unlocking lever 21. The control switch 22 is provided on the end surface 24a of the grip portion 24.

In this configuration, it is possible to improve user-friendliness of the unlocking lever 21. Since the control switch 22 is provided at the position in which a user can operate the control switch 22 while gripping the grip portion 24, it is possible to improve user-friendliness of the control switch 22. In addition, it is possible to continuously operate the control switch 22 that is a momentary switch.

(4) The unlocking lever 21 is a turning lever that extends along the back surface 3s of the seatback 3.

In this configuration, the unlocking lever 21 is disposed substantially orthogonal to a direction in which the seatback 3 is folded and is pulled upright Accordingly, a user's hand can easily follow a displacement of the unlocking lever 21 associated with the deployment operation and the folding operation of the seat 1. As a result, it is possible to realize better user-friendliness.

(5) The seatback 3 is manually folded forward and pulled upright.

That is, in this configuration, since the unlocking lever 21 is used as an operation handle, it is possible to easily perform the forward folding operation and the upright pulling operation. Since the unlocking lever 21 is disposed substantially orthogonal to the direction in which the seatback 3 is folded and is pulled upright, it is possible to more easily perform the forward folding operation and the upright pulling operation. Since the unlocking lever 21 is provided with the grip portion 24, it is possible to more easily perform the forward folding operation and the upright pulling operation.

Since the control switch 22 is provided integrally with the unlocking lever 21, it is possible to continuously operate the control switch 22 even during the course of the manual forward folding operation and the manual upright pulling operation. That is, it is possible to manually perform the forward folding operation and the upright pulling operation in parallel with the driving of the seat via the actuator 13. Accordingly, it is possible to realize good user-friendliness, (6) The seat apparatus 10 includes the forward folding mechanism 15 that can fold the seatback 3 forward while the seat 1 (the seat cushion 2) is on the way to the concave retraction portion 9 by releasing the restriction of the tilting of the seatback 3 in interconnection with the turning link 11 when the seat 1 is folded.

In this configuration, a specific unlocking operation is not required to be performed, and the seatback 3 can be folded on the seat cushion 2 while being folded forward. Since the restriction of tilt is released during the movement of the seat 1, it is possible to decrease a change in the position of the unlocking lever 21 (and the control switch 22) when the folding operation starts. Accordingly, after the unlocking lever 21 is unlocked, it is possible to smoothly operate the control switch 22. As a result, it is possible to realize better user-friendliness.

(7) When the folding operation is performed, the turning link 11 moves the seat 1 to the concave retraction portion 9 while the seat 1 makes an arc-shaped locus along with the rearward movement of the seat 1. The forward folding mechanism 15 releases the restriction of the tilting of the seatback 3 at the apex position of the locus of the seat.

In this configuration, after the seatback 3 passes the apex position of the locus of the seat, the seatback 3 is folded forward in the movement region in which the seat cushion 2 supported by the turning link 11 is considerably displaced rearward. Accordingly, a rearward displacement of the unlocking lever 21 associated with the rearward movement of the seat cushion 2 can be cancelled out by a forward displacement of the seatback 3 associated with the forward folding operation thereof. That is, it is possible to prevent a change in the position of the unlocking lever 21 in the longitudinal direction of the vehicle, and a user's hand can easily follow the unlocking lever 21. As a result, it is possible to more smoothly fold the seatback 3 forward and operate the control switch 22 via a manual operation in which the unlocking lever 21 is used as an operation handle.

(8) The unlocking lever 21 is provided at a position higher than the vertical middle position on the back surface 3s of the seatback 3. In this configuration, it is possible to more easily fold the seatback 3 forward and pull the seatback 3 upright via a manual operation in which the unlocking lever 21 is used as an operation handle.

(9) In the control switch 22, when a user faces the back surface 3s of the seatback 3, the first operation portion 22a for a folding operation is disposed on the front side, and the second operation portion 22b for a deployment operation is disposed on the rear side. In this configuration, it is possible to intuitively perform an appropriate control of the actuator corresponding to the intended deployment and folding operations. Accordingly, it is possible to realize good user-friendliness.

The following changes may be made to this embodiment.

In the above-mentioned embodiment, the locking device 8 and the unlocking lever 21 are connected to each other via the wire cable, and the turning link 11 and the forward folding mechanism 15 are connected to each other via the wire cable. However, the connection structure may be arbitrarily changed, and for example, a rod or a link may be used for connection therebetween. In addition, the configuration of the locking device 8 may be arbitrarily changed. For example, the locking device 8 may not include the latch mechanism. The seat cushion 2 may not necessarily be fixed by the seat legs 5a and 5b, and for example, the seat cushion 2 (a frame of the seat cushion 2) may be directly fixed to the vehicle floor 4. The configuration of the forward folding mechanism 15 may be arbitrarily changed, and for example, the forward folding mechanism 15 may not have a forward biasing mechanism via a spring member.

In the above-mentioned embodiment, the forward folding mechanism 15 is provided in the reclining device 7 that uses the motor as a drive source. However, the drive source is not limited to the motor, and the reclining device 7 may be manually operated. The seatback 3 may be folded forward by changing a tilt angle via the driving of the motor.

In the above-mentioned embodiment, when the folding operation is performed, the unlocking lever 21 is operated so as to unfix the seat 1 from the seat deployment portion 12 that is provided in the vehicle floor 4. However, this disclosure is not limited to that configuration in the embodiment, and also when the seat 1 is retracted in the concave retraction portion 9 while being in a folded state, the seat 1 is fixed to the concave retraction portion 9 via the locking device 8. Also when the deployment operation is performed, the unlocking lever 21 may be operated so as to unfix the seat 1 from the concave retraction portion 9.

In the above-mentioned embodiment, a push type momentary switch is used as the control switch 22 that has the two independent operation portions 22a and 22b. However, this disclosure is not limited to that type in the embodiment, and the type of the control switch 22 may be arbitrarily changed. For example, a slide switch, or a capacitance type touch switch may be used, The control switch 22 may not necessarily be a momentary switch. In addition, when the control switch 22 is operated once, the control switch 22 may be turned ON until the deployment operation and the folding operation of the seat 1 are completed. The control switch 22 may not have a plurality of operation portions. The disposition of the control switch 22 on the unlocking lever 21 may be arbitrarily changed.

In the above-mentioned embodiment, the unlocking lever 21 is a turning lever which extends vertically along the back surface 3s of the seatback 3, and a turning operation of which is performed in such a manner that the grip portion 24 is tilted along the back surface 3s of the seatback 3. The control switch 22 is provided on the end surface 24a of the grip portion 24.

Figure 9:
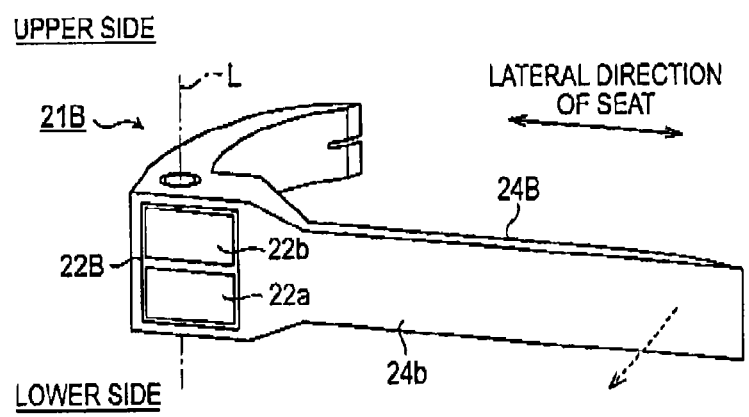
FIG. 9 is a perspective view illustrating another example of the unlocking lever.

However, this disclosure is not limited to that configuration in the embodiment, and for example, as illustrated in FIG. 9, an unlocking lever 21B has a grip portion 24B that extends along the back surface 3s of the seatback 3 in a lateral direction of the seat. The unlocking lever 21B has a turning axis L that extends vertically along the back surface 3s of the seatback 3. In addition, a control switch 22B is provided on a design surface 24b of the grip portion 24B of the unlocking lever 21B. When an unlocking operation is performed, the grip portion 24B turns toward the front side, that is, in the direction in which the seatback 3 is pulled upright. It is possible to obtain the same effects as in the above-mentioned embodiment even using such a turning lever.

Figure 10:
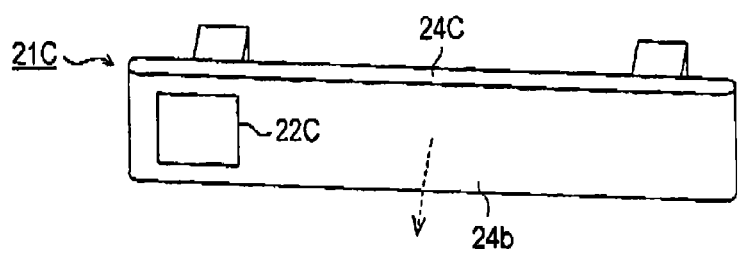
FIG. 10 is a perspective view illustrating another example of the unlocking lever.
Figure 11A:
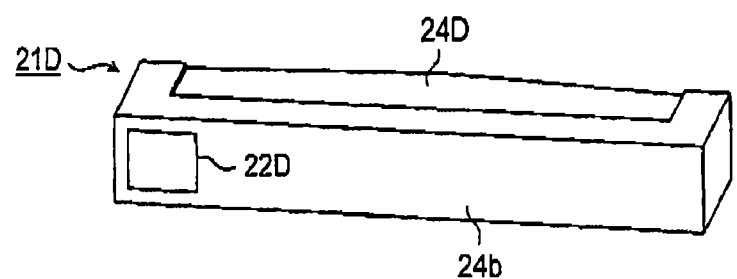
FIGS. 11A and 11B are perspective views illustrating another example of the unlocking lever.
Figure 11B:
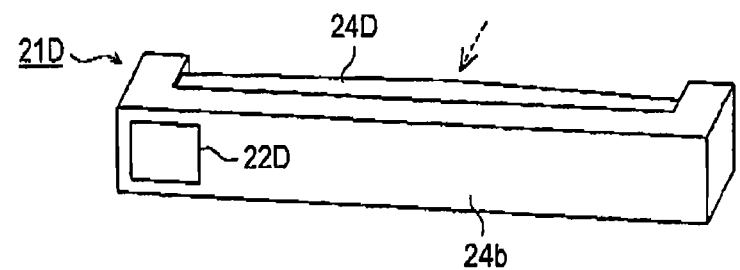

As illustrated in FIG. 10, a pull type unlocking lever 21C may be used, a grip portion 24C of which is pulled toward the front side during an unlocking operation. As illustrated in FIGS. 11A and 11B, a grip type unlocking lever 21D may be used, in which when a grip portion 24D is squeezed, the shape of the grip portion 24D is changed, and as a result, an unlocking operation is completed. A control switch 22C of the unlocking lever 2 C is provided on the design surface 24b of the grip portion 24C, and a control switch 22D of the unlocking lever 21D is provided on the design surface 24b of the grip portion 24D. Since the grip portions 24C and 24D are disposed in such a manner as to extend along the back surface 3s of the seatback 3, it is possible to obtain the same effects as in the above-mentioned embodiment.

Figure 12A:
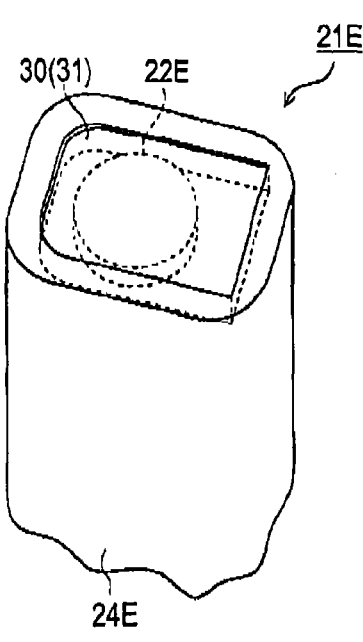
FIGS. 12A and 12B are perspective views illustrating another example of the unlocking lever.
Figure 12B:
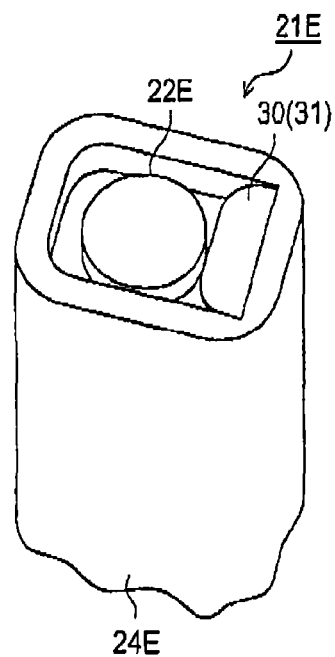

As illustrated in FIGS. 12A and 12B, an unlocking lever 21E may include a limiting mechanism 30 that can limit the operation of a control switch 22E until an unlocking operation of the unlocking lever 21E is performed. That is, in the configuration of the unlocking lever 21E, when the unlocking lever 21E is not operated, the control switch 22E is covered and hidden with a flexible plate-like cover member 31. When an unlocking operation of the unlocking lever 21E is performed, the cover member 31 is drawn into a grip portion 24E. The limiting mechanism 30 is configured in such a manner that the control switch 22E is brought into an operable state as a result.

For example, in a case where a push switch is used as the control switch, it is possible to obtain the limiting mechanism 30 having the same function by locking a push portion (a push button) into a non-displaceable state until an unlocking operation of the unlocking lever is performed.

In this configuration, it is possible to more reliably start the driving of the seat via the actuator 13 in a state where the seat 1 is unfixed from the vehicle floor 4. Accordingly, it is possible to prevent a retry operation originating from the teeth engagement of the locking device 8, and it is possible to realize good user-friendliness.

In the above-mentioned embodiment, the turning link 11 is provided as a support member for the seat 1. The turning link 11 is driven by the actuator 13. However, this disclosure is not limited to that configuration in the embodiment, and for example, the rear seat leg 5b may also act as the turning link. The type of the link mechanism formed by the support member is not necessarily limited to the turning link.

It is preferable that a seat apparatus for a vehicle according to an aspect of this disclosure includes: an unlocking lever that is operated so as to unfix a seat from a vehicle floor, and a control switch that is operated in order for the seat to switch between a deployed state in which the seat is supported on the vehicle floor and a folded state in which the seat is retracted in a concave retraction portion of the vehicle floor, when a support member of the seat is driven via the driving of an actuator, in which the unlocking lever is preferably provided in a back surface of a seatback which is disposed at an opening end of the concave retraction portion when the seatback is folded forward and the seat is retracted and the control switch is provided integrally with the unlocking lever.

After an unlocking operation is performed, when a user takes their hands off the unlocking lever, a locking device may be locked (be brought into a teeth engagement state) again due to the weight of the seat or the like. However, in this configuration, it is possible to operate the control switch in a state where the unlocking lever is unlocked. As a result, it is possible to more reliably start the driving of the seat via an actuator in a state where the seat is unfixed from the vehicle floor. Accordingly, it is possible to prevent a retry operation originating from the teeth engagement of the locking device, and it is possible to realize good user-friendliness.

In the seat apparatus for a vehicle according to the aspect of this disclosure, it is preferable that the control switch is a momentary switch.

In this configuration, when the operation of the control switch is stopped, the actuator stops quickly. Accordingly, it is possible to prevent an occurrence of pinching of the seat associated with a deployment operation and a folding operation of the seat. Since the control switch is provided integrally with the unlocking lever, it is possible to operate the control switch continuously from the unlocking operation without a pause. Accordingly, it is possible to smoothly complete the switching of the seat between the deployed state and the folded state.

In the seat apparatus for a vehicle according to the aspect of this disclosure, it is preferable that the unlocking lever is provided with a grip portion that a user grips so as to operate the unlocking lever, and the control switch is provided at a position in which a user can operate the control switch while gripping the grip portion.

In this configuration, it is possible to improve user-friendliness of the unlocking lever. Since the control switch is provided at the position in which a user can operate the control switch while gripping the grip portion, it is possible to improve user-friendliness of the control switch.

In the seat apparatus for a vehicle according to the aspect of this disclosure, it is preferable that the unlocking lever extends along the back surface of the seatback, and can unfix the seat from the vehicle floor via the turning, the pulling or the gripping of the unlocking lever.

In this configuration, the unlocking lever is disposed substantially orthogonal to the direction in which the seatback is folded and is pulled upright. Accordingly, a user's hand can easily follow a displacement of the unlocking lever associated with the deployment operation and the folding operation of the seat. As a result, it is possible to realize better user-friendliness.

In the seat apparatus for a vehicle according to the aspect of this disclosure, it is preferable that the seatback is manually folded forward and pulled upright.

In this configuration, since the unlocking lever is used as an operation handle, it is possible to easily perform the forward folding operation and the upright pulling operation.

In the seat apparatus for a vehicle according to the aspect of this disclosure, it is preferable that the seat apparatus further includes a forward folding mechanism that can fold the seatback forward while the seat is on the way to the concave retraction portion by releasing restriction of the tilting of the seatback in interconnection with the support member, when the seat is folded.

In this configuration, a specific unlocking operation is not required to be performed, and the seatback can be folded on a seat cushion while being folded forward. Since the restriction of tilt is released during the movement of the seat, it is possible to decrease a change in the position of the unlocking lever (and the control switch) when the folding operation starts. Accordingly, after the unlocking lever is unlocked, it is possible to smoothly operate the control switch. As a result, it is possible to realize better user-friendliness.

In the seat apparatus for a vehicle according to the aspect of this disclosure, it is preferable that the support member forms a link mechanism that moves the seat to the concave retraction portion while the seat makes an arc-shaped locus as the seat moves rearward, when the seat is folded, and the forward folding mechanism preferably releases the restriction of the tilting of the seatback at an apex position of the locus of the seat.

In this configuration, after the seatback passes the apex position of the locus of the seat, the seatback is folded forward in a movement region in which the seat (the seat cushion) supported by the support member is considerably displaced rearward. Accordingly, a rearward displacement of the unlocking lever associated with the rearward movement of the seat can be cancelled out by a forward displacement of the seatback associated with the forward folding operation thereof. That is, it is possible to prevent a change in the position of the unlocking lever in a longitudinal direction of a vehicle, and a user's hand can easily follow the unlocking lever. As a result, it is possible to more smoothly fold the seatback forward via a manual operation in which the unlocking lever is used as an operation handle.

In the seat apparatus for a vehicle according to the aspect of this disclosure, it is preferable that the seat apparatus further includes a limiting mechanism that can limit the operation of the control switch until an unlocking operation of the unlocking lever is performed.

In this configuration, it is possible to more reliably start the driving of the seat via the actuator in a state where the seat is unfixed from the vehicle floor. Accordingly, it is possible to prevent a retry operation originating from the teeth engagement of the locking device, and it is possible to realize good user-friendliness.

According to the aspect of this disclosure, it is possible to simplify the configuration by implementing a manual release of the locking, and to ensure good user-friendliness.

The following description is regarding technical ideas that can be obtained from the embodiments.

(a) in the seat apparatus for a vehicle, the unlocking lever is provided at a position higher than the vertical middle position on the back surface of the seatback. In this configuration, it is possible to more easily fold the seatback forward and pull the seatback upright via a manual operation in which the unlocking lever is used as an operation handle.

(b) In the seat apparatus for a vehicle, the control switch includes the first operation portion and the second operation portion which are respectively positioned on the front side and the rear side when a user faces the back surface of the seatback. When the first operation portion is operated, the actuator drives the support member in order for the seat to be folded, and when the second operation portion is operated, the actuator drives the support member in order for the seat to be deployed. In this configuration, it is possible to intuitively perform an appropriate control of the actuator corresponding to the intended deployment and folding operations. Accordingly, it is possible to realize good user-friendliness.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat apparatus for a vehicle comprising:
an unlocking lever that is operated so as to unfix a seat from a vehicle floor; and
a control switch that is operated in order for the seat to switch between a deployed state in which the seat is supported on the vehicle floor and a folded state in which the seat is retracted in a concave retraction portion of the vehicle floor, when a support member of the seat is driven via the driving of an actuator,
wherein the unlocking lever is provided in a back surface of a seatback which is disposed at an opening end of the concave retraction portion when the seatback is folded forward and the seat is retracted, and the control switch is provided integrally with the unlocking lever, and
wherein the unlocking lever is provided at a position higher than a vertical middle position on the back surface of the seatback.

2. The seat apparatus for a vehicle according to claim 1, wherein the control switch is a momentary switch.

3. The seat apparatus for a vehicle according to claim 1, wherein the unlocking lever is provided with a grip portion that a user grips so as to operate the unlocking lever, and
wherein the control switch is provided at a position in which the user can operate the control switch while gripping the grip portion.

4. The seat apparatus for a vehicle according to claim 1, wherein the unlocking lever extends along the back surface of the seatback, and can unfix the seat from the vehicle floor via turning, pulling or gripping the unlocking lever.

5. The seat apparatus for a vehicle according to claim 1, wherein the seatback is manually folded forward and pulled upright.

6. The seat apparatus for a vehicle according to claim 5 further comprising:
a forward folding mechanism that can fold the seatback forward while the seat is on the way to the concave retraction portion by releasing restriction of a tilting of the seatback in interconnection with the support member, when the seat is folded.

7. The seat apparatus for a vehicle according to claim 6, wherein the support member forms a link mechanism that moves the seat to the concave retraction portion while the seat makes an arc-shaped locus as the seat moves rearward, when the seat is folded, and
wherein the forward folding mechanism releases the restriction of the tilting of the seatback at an apex position of the locus of the seat.

8. The seat apparatus for a vehicle according to claim 1 further comprising:
a limiting mechanism that can limit the operation of the control switch until an Unlocking operation of the unlocking lever is performed.

9. The seat apparatus for a vehicle according to claim 1, wherein the control switch includes a first operation portion and a second operation portion which are respectively positioned on a front side and a rear side, when a user faces the back surface of the seatback, and
wherein when the first operation portion is operated, the actuator drives the support member in order for the seat to be folded, and when the second operation portion is operated, the actuator drives the support member in order for the seat to be deployed.

* * * * *